(No Model.) 4 Sheets—Sheet 1.
H. LEMP & C. G. ANDERSON.
AUTOMATIC ELECTRIC WELDING MACHINE.
No. 462,261. Patented Nov. 3, 1891.
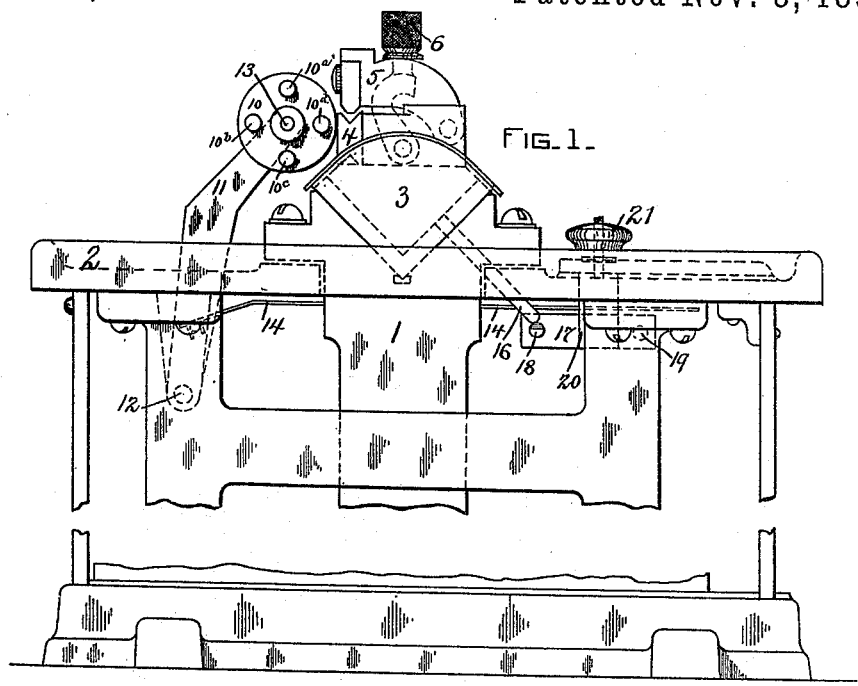
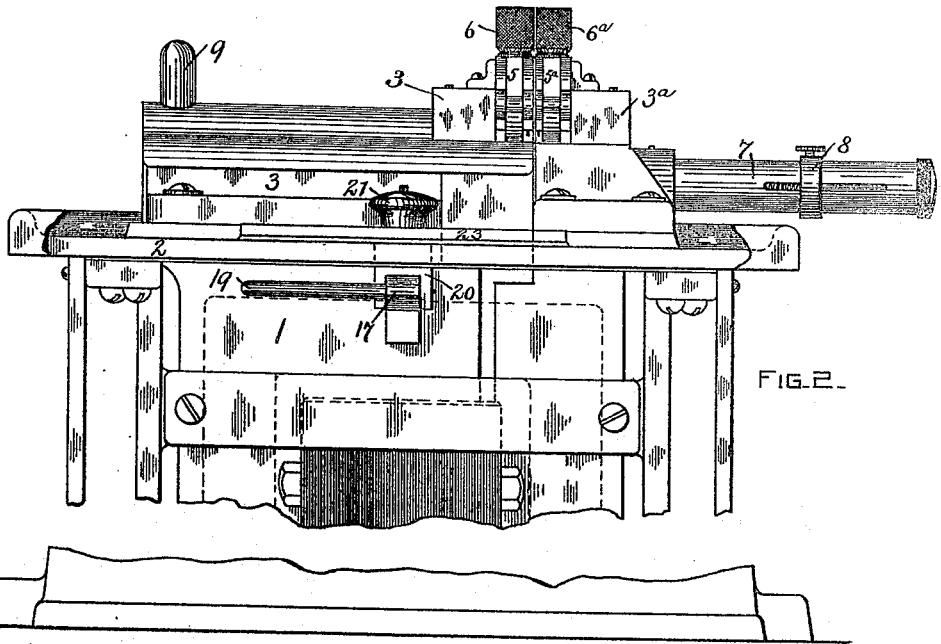
WITNESSES
T. F. Courey
Wm. H. Capel
INVENTORS
Hermann Lemp
Carl G. Anderson
By H. C. Townsend
Atty (No Model.) 4 Sheets—Sheet 2.
H. LEMP & C. G. ANDERSON.
AUTOMATIC ELECTRIC WELDING MACHINE.
No. 462,261. Patented Nov. 3, 1891.
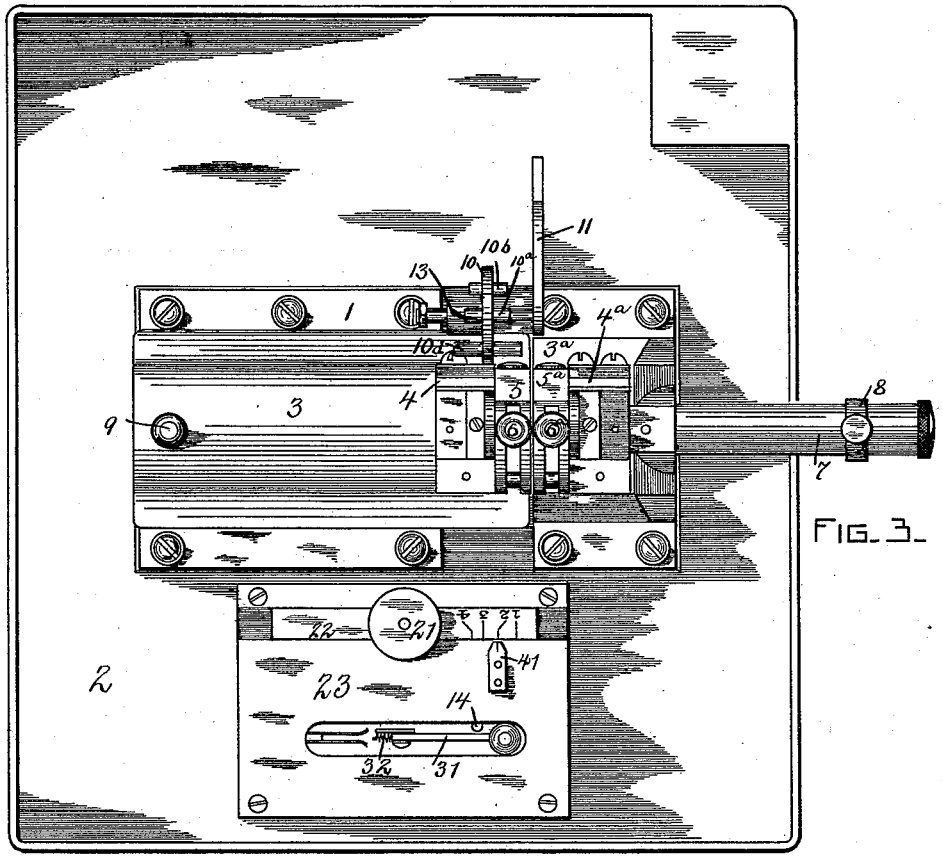
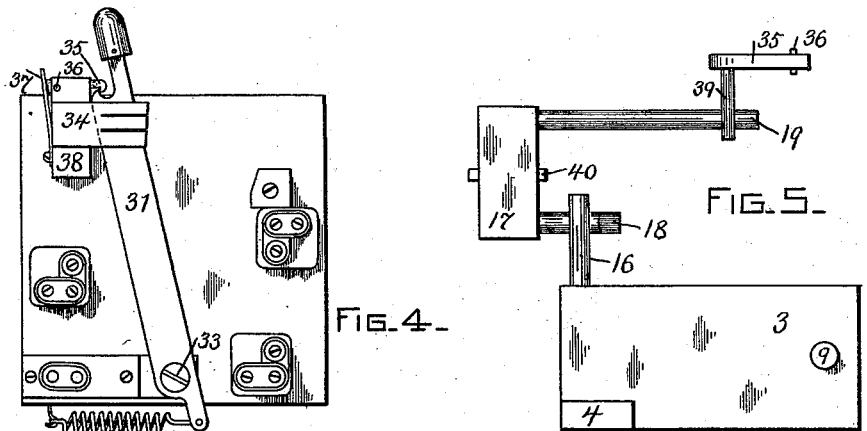
WITNESSES
T T Courey
Chas D Capel
INVENTORS:
Hermann Lemp
Carl G. Anderson
By H. C. Townsend
Atty (No Model.) 4 Sheets—Sheet 3.
H. LEMP & C. G. ANDERSON.
AUTOMATIC ELECTRIC WELDING MACHINE.
No. 462,261. Patented Nov. 3, 1891.
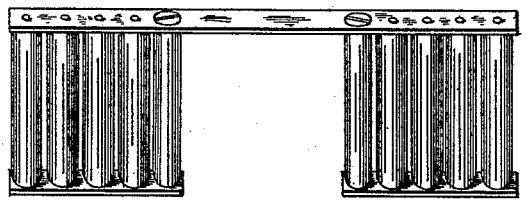
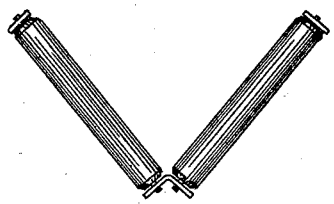
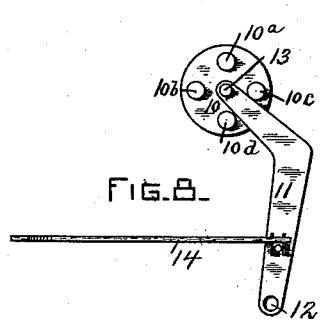
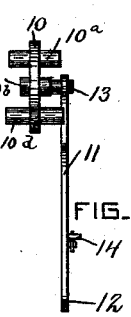
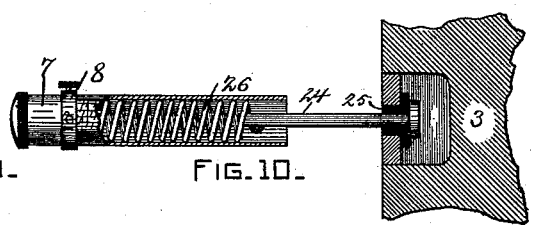
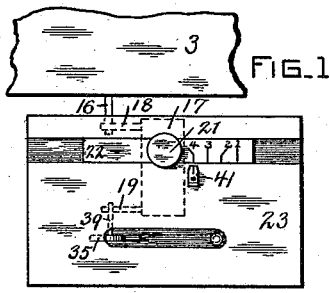
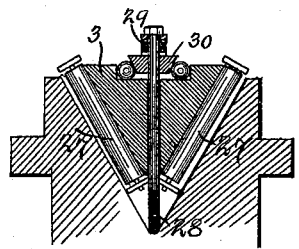
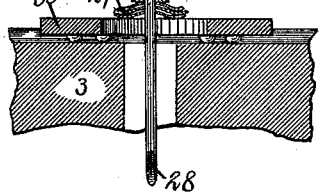
WITNESSES
INVENTORS:
Hermann Lemp
Carl G Anderson
By H. C. Townsend
Atty

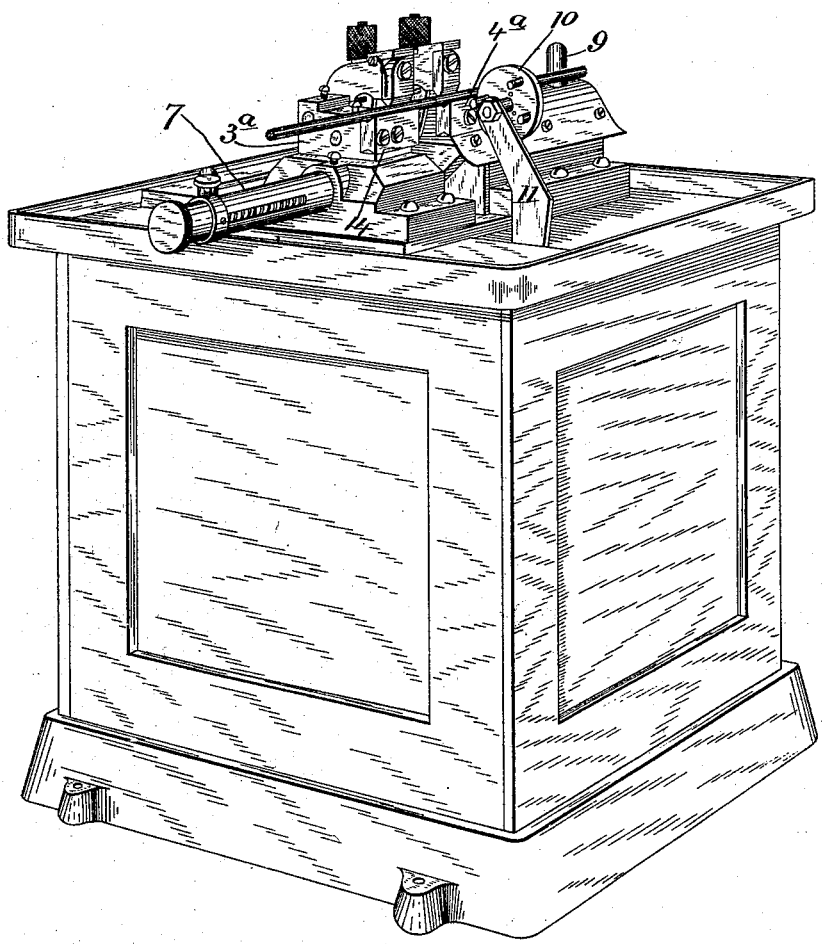

UNITED STATES PATENT OFFICE.

HERMANN LEMP AND CARL G. ANDERSON, OF LYNN, MASSACHUSETTS; SAID LEMP ASSIGNOR TO THE THOMSON ELECTRIC WELDING COMPANY, OF MAINE.

AUTOMATIC ELECTRIC-WELDING MACHINE.

SPECIFICATION forming part of Letters Patent No. 462,261, dated November 3, 1891.

Application filed February 2, 1891. Serial No. 379,931. (No model.)

*To all whom it may concern:*

Be it known that we, HERMANN LEMP, a citizen of the United States, and CARL GUSTAV ANDERSON, a subject of the King of Norway and Sweden, residents of Lynn, in the county of Essex and State of Massachusetts, have invented certain new and useful Automatic Electric-Welding Machines, of which the following is a specification.

Our invention relates to the construction of electric welding or metal-working apparatus; and it consists in certain details of construction and combinations of parts, some of which are especially useful in a machine constructed to do electric welding.

The object of the invention is to provide an apparatus by which the work—such as welding of wires or pieces of the same or of varied sizes—may be quickly, reliably, and uniformly performed and with as little manipulation as possible, and which may be easily and safely operated by persons having little or no knowledge of the mechanical and electrical conditions necessary to produce good work.

Our invention consists, first, in the combination, with the work-holder, of a series of gage-pins or stops of determinate or adjusted lengths corresponding to the different sizes of work and adapted to be interposed in the path of the movable clamp-slide or work-holder of the apparatus, so as to hold the same retracted away from the opposite holder the necessary distance for the various sizes of work.

The invention consists, also, in the combination, with the work-holders, of a stop adapted to be interposed between them and against which the ends of the pieces to be welded may be abutted for the purpose of determining the distance to which each piece shall project from its holder when the two are held apart by any one of the gage-pins or stops.

Our invention consists, further, in combining the switch or circuit-controller which governs the flow of current in the work and the stop which holds the work-holders apart in such way that the current cannot be prematurely turned on before the work is adjusted in the holders and the stop is withdrawn.

Our invention consists, also, in the combination, with the adjustable automatic cut-off mechanism which cuts off the current at a predetermined point in the operation, of a gage connected with the adjustable portion of said mechanism and graduated to different sizes of work. A cut-off mechanism of this general character forms the subject of patent to E. Thomson, No. 385,022, dated June 26, 1888.

Our present invention consists, also, of certain improvements in the mechanical construction of such a cut-off as well as in the combination, broadly, with any adjustable cut-off mechanism, of a gage such as described herein.

Our invention consists, further, in certain details of construction and combinations of parts, as hereinafter described and claimed.

We shall describe our invention as carried out by an apparatus wherein the heating electric current is supplied from the secondary of a transformer constructed as set forth in patent of H. Lemp, No. 428,618, with a secondary composed of a single turn and made of a bar or casting of square or other shape having a cut or opening at one side to make the terminals to which the two work-holders of the apparatus are connected. Our invention is, however, applicable to apparatus deriving its current from any source.

Some of the features of our invention are also particularly applicable to an apparatus such as forms the subject of patent to H. Lemp, No. 428,616, some of the features of which patent are accordingly herein shown, but for the sake only of illustrating the manner in which our invention may be carried out.

In the accompanying drawings, Figure 1 is an end view of an apparatus embodying our invention. Fig. 2 is a rear view of the same. Fig. 3 is a plan. Fig. 4 is a side view of the switch or current controller, and Fig. 5 a plan of a portion of an improved automatic trip for use therewith. Figs. 6 and 7 show in detail the construction of the parts upon the movable slide or work-holder. Fig. 8 is a side view, and Fig. 9 an edge view, of the gage which stops the movable work-holder. Fig. 10 shows in detail the spring and attachments for actuating the movable work-holder in the welding or other operation. Fig. 11 shows a detail of the automatic cut-off device. Fig. 12 is a cross-section, and Fig. 13 a longitudinal section, through a part of the work-holding slide. Fig. 14 is an isometric perspective view of the machine.

In the several figures, 1 represents the secondary of an alternating-current transformer; 2, the table, upon which the working parts of the apparatus are mounted, and 3 the slide or work-holder, which is provided with suitable clamping-jaws or other devices for holding the work—as, for instance, a piece of wire to be welded—down upon it. This part 3 slides or moves in the welding operation toward another holder and rests upon a bed or block of metal, from which it receives electric current and which may be, as indicated, a part of the secondary constituting a pole or terminal thereof. The special construction of this part of the apparatus will be better understood when it is remembered that great ease of movement is necessary to obtain good results. The friction of the contact-surfaces must be extremely small, so that the "clamp" may slide with perfect freedom when the wire is sufficiently hot. The two wires attaining a welding temperature, a spring forces the movable slide along in a direction parallel to their length, thereby effecting the weld. Should the slide stick or for any reason not move freely, the metal would evidently melt and break the secondary circuit. To obtain this perfect motion and a minimum friction, rollers have been interposed between the surfaces of the V-groove in the secondary bar and the sliding part. One method is to lay these rollers in loosely in an upright position; but they are apt to fall over sidewise and stop the slide altogether. My present invention consists in mounting the rollers in a light frame, as shown in Figs. 6 and 7, placed between secondary 1 and slide 3.

In Figs. 12 and 13 the construction is shown more in detail. A bolt 28 passes through a slot in the slide and screws into the secondary or conducting bed. The head of the bolt rests on springs 29 and these on a plate 30, which in turn rests on ball-bearings, as shown. The bolt may be screwed down quite tightly to effect perfect electrical contact of slide, rollers, and secondary. At the same time the slide may be so free as to move with the slightest touch.

The base or body of the work-holder, which is opposite to 3 and is in connection with the other terminal of the secondary or other source of current, is indicated at $3^a$. The latter when it is not movable away may be formed in one piece with or attached to a block or piece of metal constituting a part of the secondary bar. It also is provided with suitable means for holding the work firmly, as well understood in the art.

A spring which moves the slide or work-holder 3 and is for such purpose attached to the same is shown in Fig. 10 in detail, and also in the other figures. A rod 24 extends from 3 through the stationary terminal or work-holder $3^a$ (see Figs. 2 and 3) and is attached to 3, but is insulated therefrom by a bushing 25. A spring 26 is connected at one end to the rod 24 at the rear of terminal $3^a$, while the opposite end of the spring is fastened to a cross piece or head, which is attached to a collar sliding on tube 7. The end of tube 7 may rest in a socket in $3^a$. The collar is adjusted on 7 and may be fixed in the desired position thereon by means of a set-screw, as indicated, for the purpose of obtaining different welding pressure for different sizes of wire or stock.

At 4 $4^a$ are shown removable shoes or wear-pieces, which are attached to the terminals or holders 3 and $3^a$ and are provided with grooves, as shown in Fig. 14, to receive the work. The latter is held down in the grooves by clamp jaws or levers 5 $5^a$, pivoted on the terminals and engaged on their curved top edges by screws or nuts 6 $6^a$, which are carried by levers also pivoted on the terminals, but eccentrically to the curve on the upper edge of the clamp jaws or levers, as shown in Fig. 1. The grooved pieces 4 and $4^a$ are made so that when one groove has become worn or irregular they may be unscrewed, turned upside down, and a new groove presents itself.

The details of the stop or gage device for use in connection with the slide to determine the projection of the stock or wire from the holders are shown in Figs. 8 and 9. As is well known in the art, the distance to which the wire or stock should project from the holders depends upon its cross-section and its material. Smaller stock and more readily-fusible material should project less than heavier and less readily-fusible stock.

The stops or gages of adjusted lengths to be now described enable the work to be readily set in the proper position in the clamps or holders without any special adjustment other than to bring the stop marked to correspond to the size or kind of work into position between the holders or into position to hold the movable holder retracted to the proper distance and the insertion of the wire or other work into the holders until it brings up against an abutment consisting of a plate or stop interposed in proper position at the same time with the first-named stop.

We have herein shown a set of stops or gages corresponding to four different sizes or kinds of work and marked $10^a$ $10^b$ $10^c$ $10^d$. They are for convenience mounted on a rotatable disk or plate 10, which is pivoted on a spindle 13, carried by a bent lever 11, the latter being pivoted at 12 on the frame of the machine or other suitable support, so that the disk carrying the stops may be swung into and out of position between the holders. The disk also conveniently forms the stop-plate or abutment against whose opposite sides the wires are abutted when they are placed in the holders. The disk may be also slid upon the spindle longitudinally, so as to accommodate itself to the proper position between the holders. The gages or stop-pins are each of a certain length and project from the disk, as shown. They may each project to an equal distance from the two sides of the plate or disk or may project farther on one side than on the other. In the former case each would serve to set or hold the parts in proper position for welding two wires of the same size and material, which should obviously project from their holders to equal distances. If the gage is made with reference to use in the welding of pieces of different cross-section or material end to end, the stop or gage-pin should obviously extend farther on the side toward the clamp or holder which receives the work requiring to project the farther from its holder.

In using the device the movable slide is retracted against the influence of the spring until the gage can be thrown forward between the clamps or holders, with the pin or stop corresponding to the work to be done, in position to be engaged by the slide 3 and holder 3ª. The wire can now be readily inserted, the clamps being held apart and their ends abutted against the plate or disk 10 or directly against one another, if desired, the plate being in such case cut away near the stop-pins or gages. In the latter case the amount of projection of the pins should evidently be less by the thickness of the plate, while if the plate is used the total separation of the holders produced by the pins would be slightly greater than the total projection of the two pieces to be welded.

In case the projection of the two pieces from the holders is different in amount, it is especially desirable to employ the plate as an abutment for the ends of the pieces, since the proper relative projection of the two pieces (the stop-pins in such case projecting at opposite sides the proper distances) can be readily secured. The wires having been inserted and abutted against one another or the plate, the gage may be withdrawn, leaving the two wires in abutment with one another and subject to the spring-pressure applied to the slide 3, so that when they are softened by the current to the requisite degree the slide will move and weld them.

The automatic cut-off mechanism to be now described operates to cut off the current when the weld is effected. The switch or current-controller forming a part of such automatic cut-off mechanism may act on the circuit of the primary of the transformer when a transformer is used or act on any other portion of the circuits or of the current-supply apparatus, so as to cut off the flow in the work or cause the current to flow, as required.

I shall herein describe the action of the cut-off mechanism as if it embodied a switch or circuit-breaker in the primary of the transformer.

Fig. 4 shows a form of switch adapted to the purpose. The switch is mounted upon the back of the welder, the handle passing through a slot in the table to allow the operator to reach it easily. A blade 31 is pivoted at 33, and a spring 32 holds the switch open normally. When thrown in contact with the terminal 34, mounted on insulation 38, a catch 35 engages a projection on the blade and holds it. A light spring 37 holds the catch 35 down until some other influence throws it up and releases the switch. The switch is controlled by a detent or trip mechanism of improved construction, illustrated in Figs. 5 and 11. A beam or lever 17 is pivoted at 40 on a suitable movable support, to be presently described, and has two pins or arms 18 and 19 secured to opposite ends and at right angles to it. On the catch 35 is another pin, which is at right angles to 19 and rests upon it. The pin 18 is slightly beveled on its free end, all as shown. On the clamp-slide 3 is a pin 16, which may engage the pin 18 to tilt the beam 17 and raise pin 19. This lifts the catch and the switch flies back, opening the circuit. To regulate the position of the release and so open the circuit at different points for various sizes of wire, the pivot 40 on the beam is attached to a fork 20, (see Fig. 2,) that may slide on a plate 23 and be fastened by a thumb-screw 21. The reason for this adjustment will be apparent. The smaller the wire the less the projection beyond the contacts and the less distance between the two clamps. This means that the sliding clamp is not brought back as far as when large wire is used, and in order that the two wires may in the case of smaller wire or stock be forced together a certain amount before the switch is released the tripping devices must be adjusted so as not to release the switch so soon in the forward movement of the holder 3. This adjustment is accomplished by moving the beam or lever 17 bodily, so as to move the end of the arm 18 toward or away from the position where it will be engaged by pin 16. For this purpose it is only necessary to loosen the knob 21 and slide it with the fork carrying the beam the proper distance to the right, Fig. 11, for smaller wire and then set the parts by tightening the knob.

To aid in the adjustment we provide in connection with the adjustable portion of the cut-off mechanism a scale which is graduated to the different sizes of wire, so that it is only necessary to move the parts to the proper point on the scale, when the parts will be set to position for releasing the switch at the proper point in the welding operation. As shown, the scale is carried by the fork or knob and is used in connection with an index 41 upon the table. All that is necessary then is to bring the number on the scale corresponding to the number or size of wire to be welded into coincidence with the pointer 41 and tighten the thumb-screw.

In order that the switch may not be closed before the wire has been set in the holders and the gage 10 withdrawn from between the holders, we control the operation of said switch by the position of the gage or support for the same. This is conveniently done by arranging a stop or obstruction to the movement of the switch and connecting such stop to the arm 11.

Referring once more to Fig. 8, 14 is a rod or flat strip, which is fastened to the lever 11, as indicated. The moving of the lever will evidently throw this strip back and forward. Referring now to Fig. 1, it will be seen that this strip extends across the under side of the welder-table to the switch. When the gage is thrown forward, this rod 14 comes in front of the switch, so that the latter cannot be thrown in contact with 34, thus obviating any liability of closing the circuit except when the wire is in place and the gage withdrawn.

The operations necessary to make a weld on this machine are as follows: The size of wire is determined and the adjustable cut-off set at proper point. The gage-disk 10 is rotated until the stop-pin having corresponding number is opposite the clamps, and the movable clamp is drawn back by means of handle 9. The gage is then thrown forward and left in between the holders, after which the wires are placed in the clamps with the ends to be welded abutting against the disk 10. The gage is then removed and the switch closed, whereupon the wires will heat, soften, the spring effect the weld, and the switch will be released. The wire may then be removed.

What we claim as our invention is—

1. The combination, with the sliding carriage or work-holder in an electric welding or metal-working apparatus, of a series of gages or stop-pins of adjusted lengths for keeping the same retracted at different determinate positions, dependent upon the size of the work, as and for the purpose described.

2. In an electric metal-working apparatus, the combination, with the two work-holders, one or both movable to and from one another, of a rotatable stop or gage for determining the separation of the same when the work is put in place, and an intermediate stop against which the work is abutted to determine its projection from the holder.

3. The combination, with the work-holders, slide, or carriage in an electric welding or metal-working apparatus, of a series of stops or gages of varied adjusted lengths for holding the slide and the opposite holder a determinate distance apart, dependent upon the size of the work.

4. The combination, with an electric-welding apparatus, of a rotable disk or plate carrying stop-pins of adjusted lengths adapted to keep the work-holders apart, and a swinging or movable support for said disk supported in position opposite the work-holders.

5. The combination, with an electric-welding apparatus, of a series of stop-pins of adjusted lengths for keeping the work-holders apart, and an attached or connected stop against which the two pieces to be welded may abut, as and for the purpose described.

6. A gage for an electric-welding apparatus, comprising a plate or disk against opposite sides of which the work may be abutted, and a series of pins projecting from opposite sides of the plate to different distances and adapted to be engaged by the work-holders.

7. The combination, with an electric metal-working apparatus, of a pivoted disk mounted on a suitable support, whereby it may be moved into and out of position between the work-holders, and a series of pins or projections of different or adjusted lengths projecting transversely from said disk.

8. The combination, with an electric welding or metal-working apparatus, of a pivoted gage-disk 10, pins projecting from opposite sides of the same, and an arm 11, carrying a spindle upon which said disk turns, as and for the purpose described.

9. The combination, with the work-holders, in an electric welding or metal-working apparatus, of a series of stop-gages mounted on a pivoted plate or support adapted to slide longitudinally on its pivot or bearing.

10. In an electric metal-working apparatus, the combination, with the work-holders, of a stop or stops adapted to hold the same apart during application of the work, and a stop against which the work may abut to limit its projection from the clamp or holder.

11. In an electric welding or metal-working apparatus, the combination, with the work holders or clamps and their adjustable cut-off mechanism, of a gage connected with said cut-off mechanism and graduated to different sizes of work.

12. The combination, in an electric welding or metal-working apparatus, of a stop for holding the work-holders apart during application of the work, and a switch or current-controller whose position is governed by said stop, as and for the purpose described.

13. The combination, with the work-holders, of a stop adapted to hold the same apart, a switch or current-controller in the circuit of the primary for the transformer connected to said work-holders, and a stop-arm connected to and movable with the first-named stop into and out of the path of said switch.

14. In an electric metal-working apparatus, the combination, with a conducting work-carrying slide, of the conducting rolls or cylinders mounted in a frame and interposed between the slide and a conducting bed or block connected to a source of electric energy.

15. In an electric metal-working apparatus, the combination, with a movable work-holder, of a rod or extension leading through the opposite work-support, a spring connected to the rod, a tube, and an adjustable block or head in said tube connected to the spring.

16. In an electric metal-working apparatus, the combination, with the work-carrying slide, of a fixed bolt, a plate between the head of the bolt and top of the slide, and friction balls or rolls upon which said plate bears.

17. The combination, in an electric metal-working apparatus, of the slide 3, the bolt passing down through the same, a plate 30, springs 29 between the head of the bolt and the plate, and ball-bearings for the said plate.

Signed at Lynn, in the county of Essex and State of Massachusetts, this 23d day of January, A. D. 1891.

HERMANN LEMP.
    CARL G. ANDERSON.

Witnesses:
 WARREN B. LEWIS,
 JOHN W. GIBBONEY.